(12) United States Patent
An et al.

(10) Patent No.: US 11,722,953 B2
(45) Date of Patent: Aug. 8, 2023

(54) COMMUNICATION WITH A DEVICE ON NEARBY WIRELESS NETWORK

(71) Applicant: International Business Machines Corporation, Armonk, NY (US)

(72) Inventors: Zheng Lei An, Beijing (CN); Yan Huang, Beijing (CN); Lei Wang, Beijing (CN); Kai Feng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 17/412,351

(22) Filed: Aug. 26, 2021

(65) Prior Publication Data
US 2023/0068195 A1    Mar. 2, 2023

(51) Int. Cl.
*H04W 48/16*   (2009.01)
*H04W 76/10*   (2018.01)
*H04W 48/12*   (2009.01)

(52) U.S. Cl.
CPC ........... *H04W 48/16* (2013.01); *H04W 48/12* (2013.01); *H04W 76/10* (2018.02)

(58) Field of Classification Search
CPC ...... H04W 48/16; H04W 48/12; H04W 76/10
See application file for complete search history.

(56) References Cited

U.S. PATENT DOCUMENTS

2019/0182663 A1   6/2019   Wang
2022/0408349 A1*  12/2022  Kneckt ................. H04W 76/19

OTHER PUBLICATIONS

Agarwal "Let Others Contact You Through Your Own Wi-Fi Network." Published date: Mar. 19, 2012. 5 Pages.
Agarwal, "How to Communicate your Displeasure with Neighbours using Wi-Fi" Published date: Jan. 15, 2013. 6 Pages.
Aneja et al., "Profile-Based Ad Hoc Social Networking Using Wi-Fi Direct on the Top of Android" Published date: Oct. 17, 2018. 8 Pages.
Gupta et al., "Bit-Stuffing in 802.11 Beacon Frame: Embedding NonStandard Custom Information." International Journal of Computer Applications (0975-8887). vol. 63—No. 2, Feb. 2013. 7 Pages.

* cited by examiner

*Primary Examiner* — Diane D Mizrahi
(74) *Attorney, Agent, or Firm* — Cantor Colburn LLP; Tihon Poltavets

(57) ABSTRACT

Methods, systems, and computer program products for communicating with a device on nearby wireless network are provided. Aspects include receiving, by a user device, a beacon frame from an access point of a wireless network. Aspects also include obtaining, by the user device from the beacon frame, direct link information for the wireless network, wherein the direct link information includes connection information for a guest network associated with the wireless network. Aspects further include receiving, by the user device from a user, a message intended for the device on the wireless network and connecting, by the user device, to a guest network. Aspects also include transmitting, by the user device, the message to the device.

20 Claims, 6 Drawing Sheets

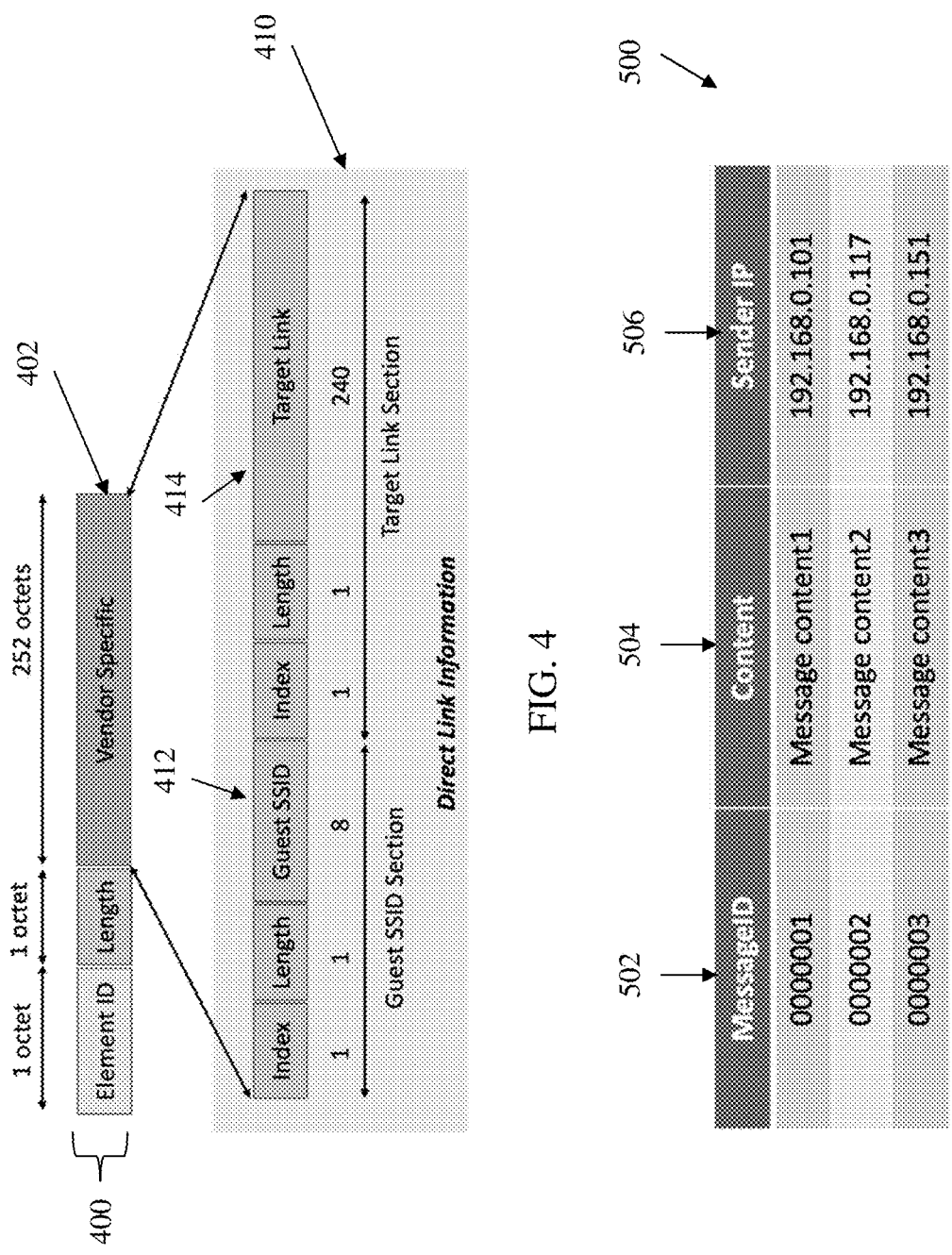

COMMUNICATION WITH A DEVICE ON NEARBY WIRELESS NETWORK

BACKGROUND

The present invention generally relates to communications systems, and more specifically, to a communications system that enables communication with a device on a nearby wireless network.

Often, it is desirable for a user of a first electronic device to communicate with the users of other nearby wireless devices. However, for a first electronic device to communicate with other nearby wireless devices, the first electronic device must either be connected to the same local network as the nearby wireless devices, or the first electronic device must establish a point-to-point connection with the nearby wireless devices.

SUMMARY

Embodiments of the present invention are directed to a computer-implemented method for communicating with a device on a nearby wireless network. A non-limiting example of the computer-implemented method includes receiving, by a user device, a beacon frame from an access point of a wireless network. The method also includes obtaining, by the user device from the beacon frame, direct link information for the wireless network, wherein the direct link information includes connection information for a guest network associated with the wireless network. The method further includes receiving, by the user device from a user, a message intended for the device on the wireless network and connecting, by the user device, to a guest network. The method also includes transmitting, by the user device, the message to the device.

Embodiments of the present invention are directed to a system for enabling communication with a device on a nearby wireless network. A non-limiting example of the system includes a processor configured to perform receiving, by a user device, a beacon frame from an access point of a wireless network. The processor is also configured to perform obtaining, by the user device from the beacon frame, direct link information for the wireless network, wherein the direct link information includes connection information for a guest network associated with the wireless network. The processor is further configured to perform receiving, by the user device from a user, a message intended for the device on the wireless network and connecting, by the user device, to a guest network. The processor is also configured to perform transmitting, by the user device, the message to the device.

Embodiments of the invention are directed to a computer program product for communicating with a device on a nearby wireless network, the computer program product comprising a computer readable storage medium having program instructions embodied therewith. The program instructions are executable by a processor to cause the processor to perform a method. A non-limiting example of the method includes receiving, by a user device, a beacon frame from an access point of a wireless network. The method also includes obtaining, by the user device from the beacon frame, direct link information for the wireless network, wherein the direct link information includes connection information for a guest network associated with the wireless network. The method further includes receiving, by the user device from a user, a message intended for the device on the wireless network and connecting, by the user device, to a guest network. The method also includes transmitting, by the user device, the message to the device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a block diagram of a beacon frame according to one or more embodiments of the invention;

FIG. 5 depicts a block diagram of a feedback table according to one or more embodiments of the invention;

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

In urban environments, there is a proliferation of private wireless networks, such as WiFi networks. For example, in a commercial building or residential building each business or tenant may have a private WiFi network. Access points, such as routers, of WiFi networks are configured to periodically broadcast a beacon frame, which announces the presence of a WiFi network and to synchronize the members of the service set of the WiFi network. As discussed above, often, it is desirable for a user of a first electronic device to communicate with the users of other nearby wireless devices.

Turning now to an overview of the aspects of the invention, one or more embodiments of the invention address the above-described shortcomings of the prior art by providing methods, systems, and computer program products for communicating with a device on a nearby wireless network. In exemplary embodiments, direct link information is embedded in the beacon frame that is broadcasted by an access point of a WiFi network. The direct link information is used by nearby electronic devices to connect to a guest network, managed by the access point, and to send messages to electronic devices connected to the WiFi network.

Figure 1:
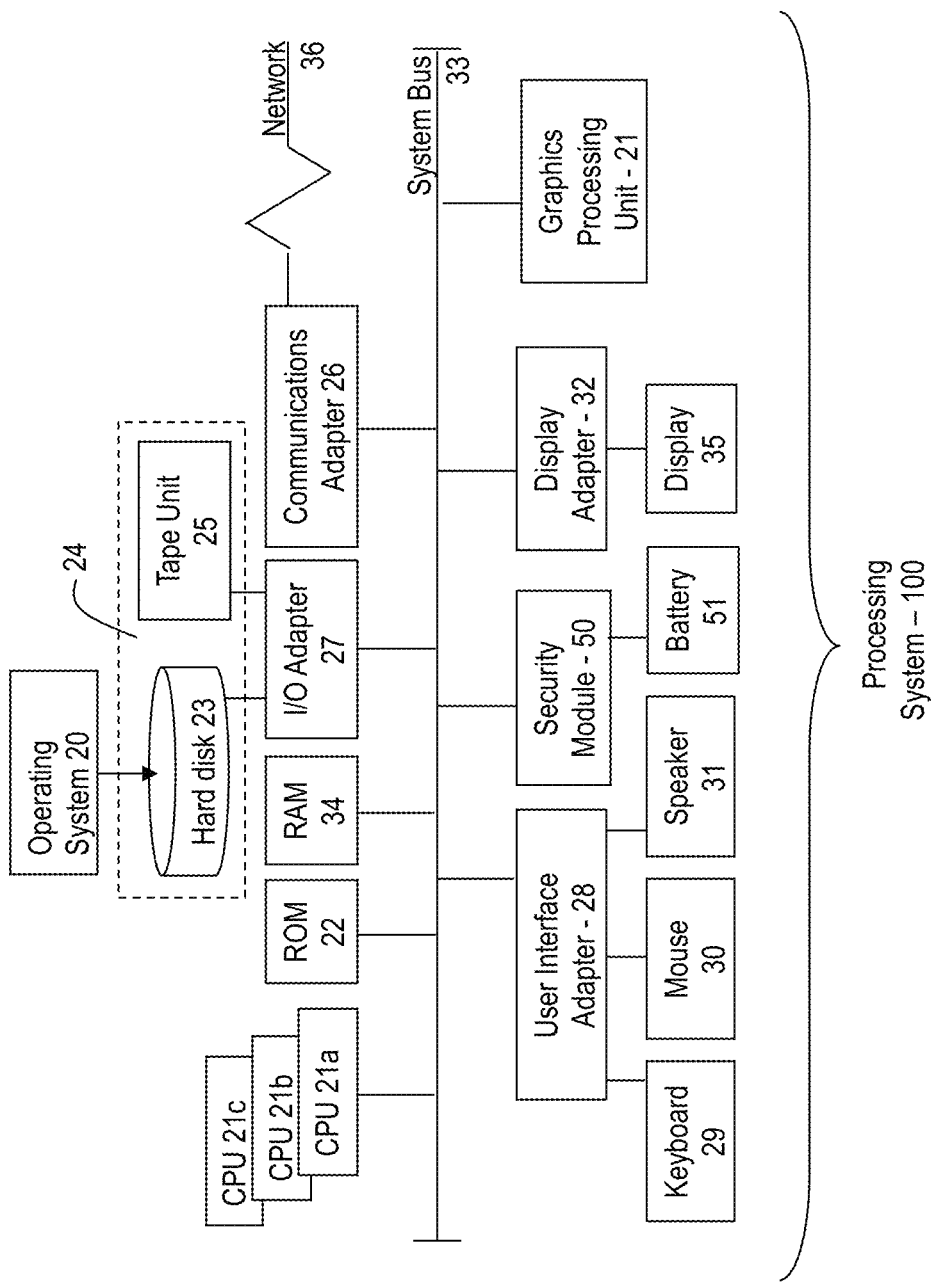
FIG. 1 depicts a block diagram of a computer system for use in implementing one or more embodiments of the invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 20 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

In exemplary embodiments, the processing system 100 is a secure processing system that includes a security module 50. The security module 50 is disposed on pluggable security card that can be easily removed from the processing system 100. The processing system 100 also includes a battery 51 that is configured to provide power to a detection circuit that monitors the presence of the security module 50.

Figure 2:
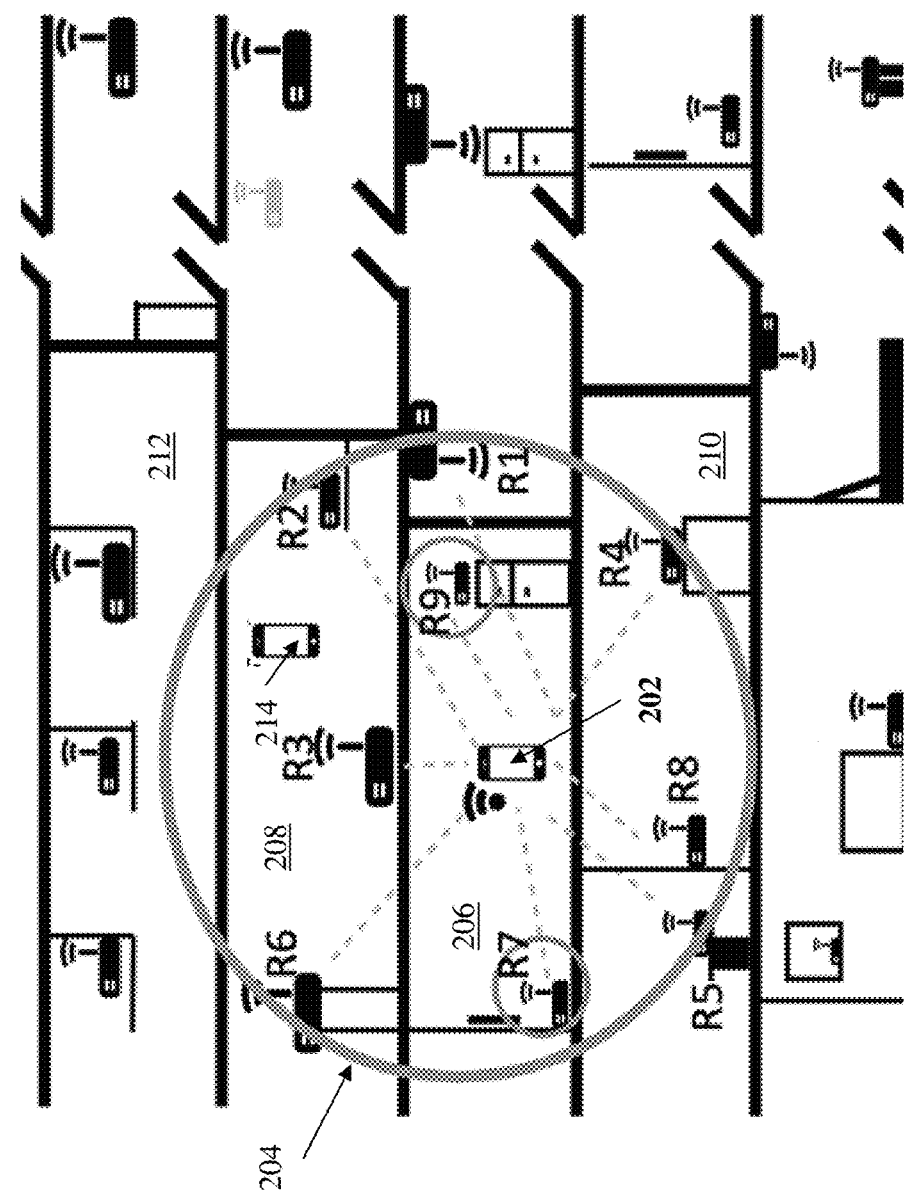
FIG. 2 depicts a diagram of an environment having a plurality of WiFi networks in accordance with an embodiment of the invention.

Referring now to FIG. 2, a diagram of an environment 200 having a plurality of WiFi networks is shown. As illustrated, the environment 200 includes a plurality of separate spaces 206, 208, 210, 212, such as apartments or businesses, that each have a network that includes one or more access points, R1-R9. Space 206 includes an electronic device 202 that is connected to a local network via one of the access points R7 and R9. Space 208 includes an electronic device 214 that is connected to a private network via one of access points R6, R3, and R2 that are part of the private network and space 210 includes access points R8 and R4 that are part of another private network. As illustrated, the electronic device 202 is within communications range 204, referred to herein as nearby, of access points R6, R3, and R2 that are disposed in space 208 and is also nearby access points R8 and R4 that are disposed in space 210.

Since electronic device 202 and electronic device 214 are not connected to the same networks, communications between the two devices would require a point-to-point connection to be established. Exemplary embodiments provide methods, systems, and computer program products to enable communications between the electronic device 202 and electronic device 214. In exemplary embodiments, direct link information is embedded in a beacon frame that is broadcasted by one or more access points R1-R9. The direct link information is used by nearby electronic devices to connect to a guest network, managed by the access point, and to send messages to electronic devices connected to the WiFi network. In an example, access point R3 will include direct link information into beacon frames that it broadcasts, and electronic device 202, which is not connected to the network managed by access point R3, will receive the beacon frame. Electronic device 202 will obtain the direct link information from the beacon frame and use that direct link information to transmit a message to electronic device 214.

Figure 3:
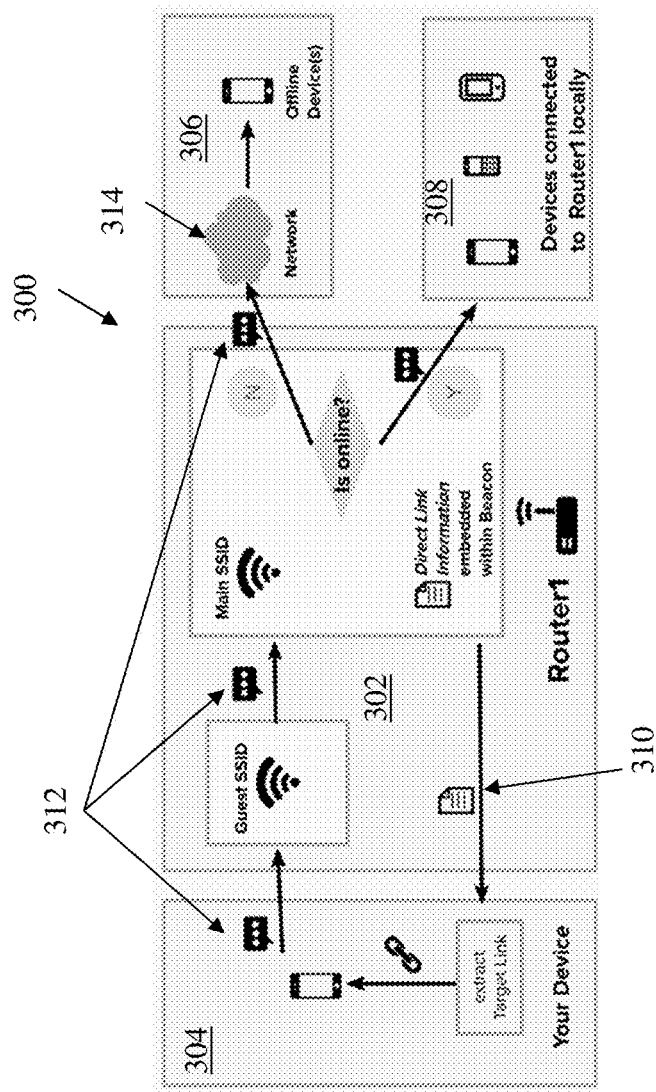
FIG. 3 depicts a schematic diagram of a system for enabling communication with an electronic device on a nearby wireless network in accordance with various embodiments of the invention.

Referring now to FIG. 3 a schematic diagram of a system 300 for enabling communication with an electronic device on a nearby wireless network in accordance with various embodiments of the invention is shown. As illustrated, a router 302 broadcasts direct link information 310, which is received by an electronic device 304. The electronic device 304, receives the direct link information 310 and uses the direct link information to connect to a guest network managed by the router 302. Once connected to the guest network, the electronic device 304 transmits a message 312, via the guest network, to a target link obtained from the direct link information. Next, the router 302 forwards the message 312 to one or more electronic devices 308 that are connected to the network managed by the router 302. In the event that no electronic devices are connected to the network managed by the router 302, the router 302 is configured to transmit the message 312 to an electronic device 306 via a network 314, that is not managed by the router 302. In one embodiment, the network 314 includes one or more public network, such as the internet. In exemplary embodiments, the guest network is separate from the main network managed by the router 302 to protect the security of the main network.

Referring now to FIG. 4 a block diagram of a beacon frame 400 according to one or more embodiments of the invention is shown. In one embodiment, the beacon frame 400 includes a vendor specific field 402 that has a capacity of 252 octets data. In exemplary embodiments, direct link information 410 is transmitted in the beacon frame in the vendor specific field 402. The direct link information 410 includes a guest SSID 412 and a target link 414. The target link 414 is the destination that the message will be sent to.

Referring now to FIG. 5 a block diagram of a feedback table 500 according to one or more embodiments of the invention is shown. In exemplary embodiments, the feedback router table 500 is configured to record information of a sender of a message that can be used to transmit a feedback message to the sender. In exemplary embodiments, one or more access points of a network are configured to store the feedback table 500. The feedback table 500 includes a messageID 502, a message content 504, and an IP address 506 of the sender. In exemplary embodiments, the messageID 502 is a unique number that is assigned to each message as it is received by the access point. The message content 504 includes the content of the messageID 502 and the IP address 506 is the IP address of the sender device on the guest network. In exemplary embodiments, when a receiver of a message wants to reply to the message, the replied message can be returned to the sender by checking the feedback router table 500 if the sender is still connected to the guest network.

Figure 6:
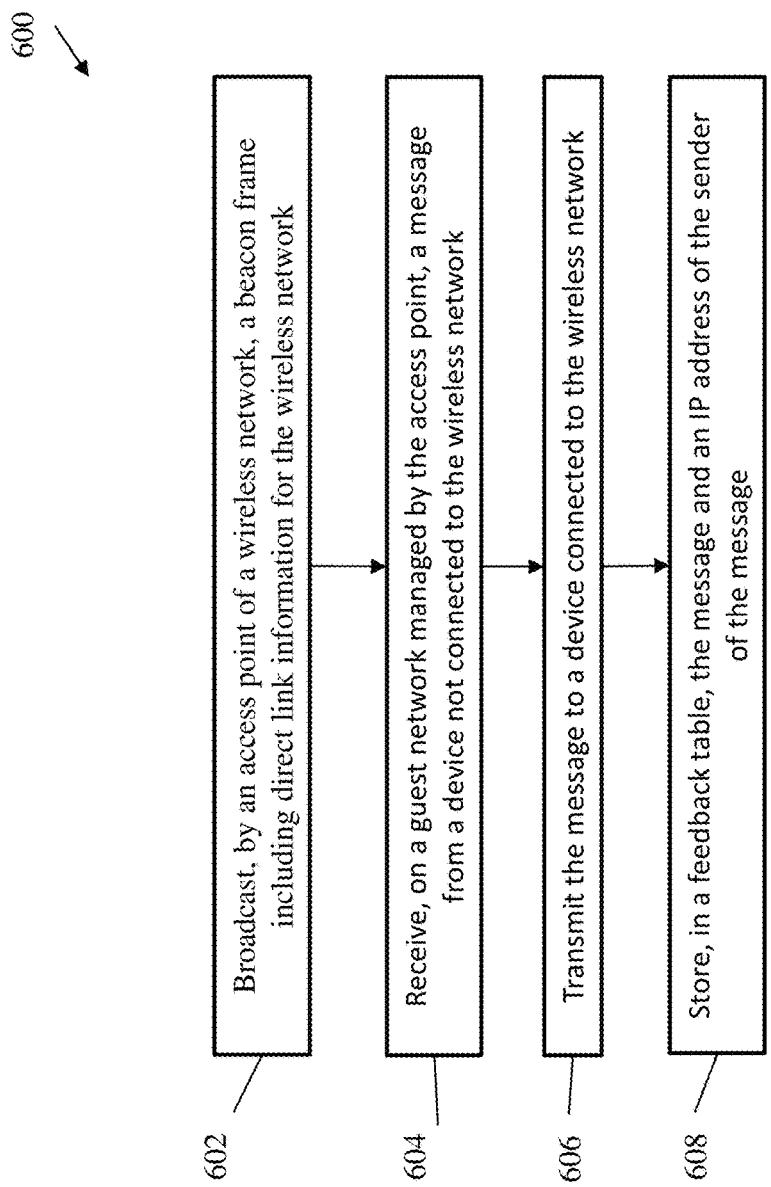
FIG. 6 depicts a flow diagram of a method for enabling communication between a device on a wireless network and a nearby electronic device according to one or more embodiments of the invention.

Referring now to FIG. 6 a flow diagram of a method 600 for enabling communication between a device on a wireless network and a nearby electronic device according to one or more embodiments of the invention is shown. The method 600 includes broadcasting, by an access point of a wireless network, a beacon frame including direct link information for the wireless network, as shown at block 602. Next, as shown at block 604, the method 600 includes receiving, on a guest network managed by the access point, a message from a device not connected to the wireless network. The method 600 also includes transmitting the message to a device connected to the wireless network, as shown at block 606. Optionally, the method 600 includes storing, in a feedback table, the message and an IP address of the sender of the message, as shown at block 608.

Figure 7:
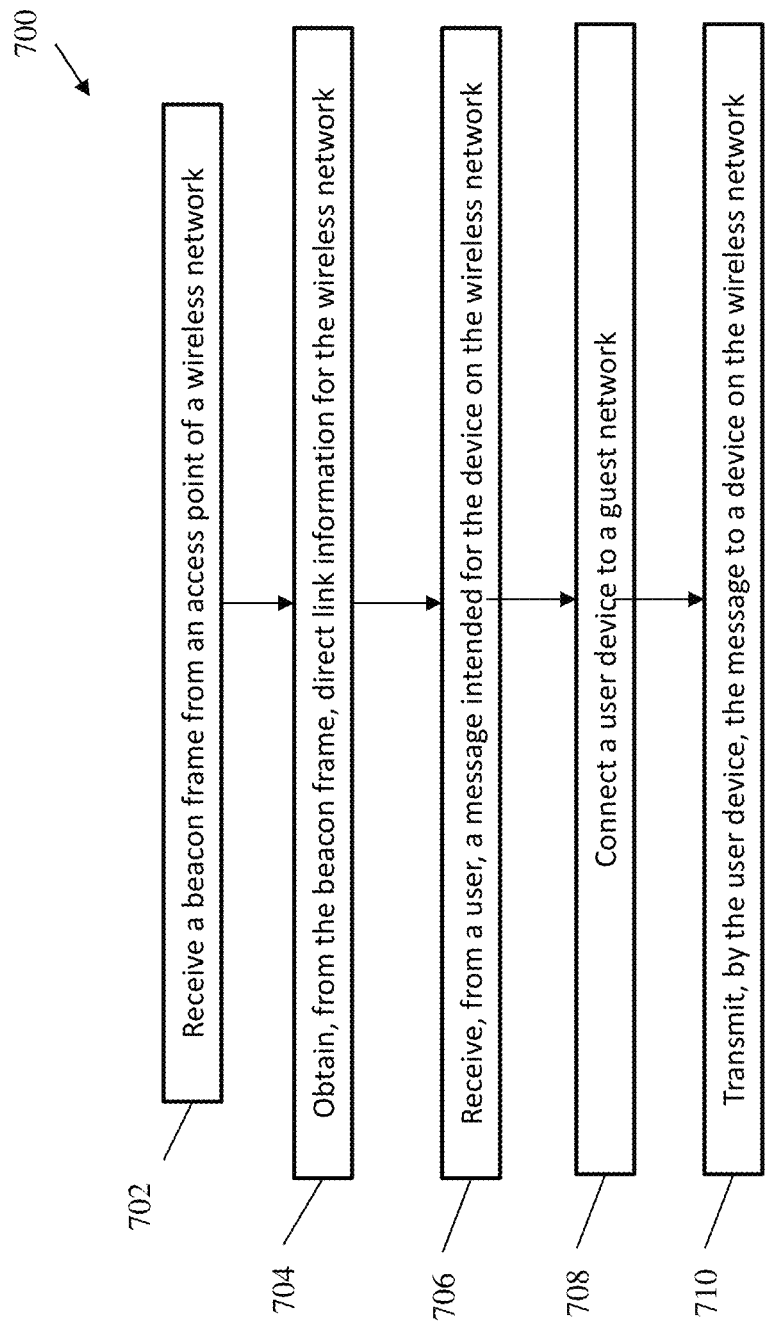
FIG. 7 depicts a flow diagram of a method for communicating with a device on a nearby wireless network according to one or more embodiments of the invention.

Referring now to FIG. 7 a flow diagram of a method 700 for communicating with a device on a nearby wireless network according to one or more embodiments of the invention is shown. The method 700 includes receiving a beacon frame from an access point of a wireless network, as shown at block 702. In exemplary embodiments, the user device is not connected to the wireless network when the user device receives the beacon frame. Next, as shown at block 704, the method 700 includes obtaining, from the beacon frame, direct link information for the wireless network. In exemplary embodiments, the direct link information includes a guest SSID for the guest network and a target link. In one embodiment, the direct link information is obtained from a vendor specific information field of the beacon frame. The method 700 also includes receiving, from a user, a message intended for the device on the wireless network, as shown at block 706. Next, as shown at block 708, the method 700 includes connecting a user device to a guest network. The method 700 further includes transmitting, by the user device, the message to a device on the wireless network, as shown at block 710. In exemplary embodiments, transmitting the message to the device includes transmitting a message to a location specified in the target link. In exemplary embodiments, a user device is configured to receive a response to the message from the device while the user device is connected to the guest network.

In exemplary embodiments, a user device is configured to displaying a list of nearby wireless networks to the user. In one embodiment, each of the nearby wireless networks are displayed to the user with an estimated distance to the closest access point of the wireless network. The estimated distance to the closest access point of the wireless network is determined based on a signal strength of a signal from the closest access point. Accordingly, when a user wants to communicate with a device on a nearby network, the user can access the list of nearby wireless networks and select a network that they would like to send a message to.

Additional processes may also be included. It should be understood that the processes depicted in FIGS. 6 and 7 represent illustrations, and that other processes may be added, or existing processes may be removed, modified, or rearranged without departing from the scope and spirit of the present disclosure.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for communicating with a device on nearby wireless network, the method comprising:
   receiving, by a user device, a beacon frame from an access point of a wireless network;
   obtaining, by the user device from the beacon frame, direct link information for the wireless network, wherein the direct link information includes connection information for a guest network associated with the wireless network;
   receiving, by the user device from a user, a message intended for the device on the wireless network;
   connecting, by the user device, to a guest network; and
   transmitting, by the user device, the message to the device.

2. The computer-implemented method of claim 1, wherein the user device is not connected to the wireless network when the user device receives the beacon frame.

3. The computer-implemented method of claim 1, wherein the direct link information includes a guest service set identifier (SSID) for the guest network and a target link.

4. The computer-implemented method of claim 3, wherein transmitting the message to the device includes transmitting a message to a location specified in the target link.

5. The computer-implemented method of claim 1, wherein the direct link information is obtained from a vendor specific information field of the beacon frame.

6. The computer-implemented method of claim 1, further comprising receiving, by the user device, a response to the message from the device while the user device is connected to the guest network.

7. The computer-implemented method of claim 1, further comprising displaying a list of nearby wireless networks to the user, wherein each of the wireless networks to the user includes an estimated distance to a closest access point of the wireless network that is determined based on a signal strength of a signal from the closest access point.

8. A system comprising:
   one or more processors for executing computer-readable instructions, the computer-readable instructions controlling the one or more processors to perform operations comprising:
   receiving, by a user device, a beacon frame from an access point of a wireless network;
   obtaining, from the beacon frame, direct link information for the wireless network, wherein the direct link information includes connection information for a guest network associated with the wireless network;
   receiving, from a user, a message intended for the device on the wireless network;
   connecting to a guest network; and
   transmitting the message to the device.

9. The system of claim 8, wherein the user device is not connected to the wireless network when the user device receives the beacon frame.

10. The system of claim 8, wherein the direct link information includes a guest service set identifier (SSID) for the guest network and a target link.

11. The system of claim 10, wherein transmitting the message to the device includes transmitting a message to a location specified in the target link.

12. The system of claim 8, wherein the direct link information is obtained from a vendor specific information field of the beacon frame.

13. The system of claim 8, wherein the operations further comprise receiving, by the user device, a response to the message from the device while the user device is connected to the guest network.

14. The system of claim 8, wherein the operations further comprise displaying a list of nearby wireless networks to the user, wherein each of the wireless networks to the user includes an estimated distance to a closest access point of the wireless network that is determined based on a signal strength of a signal from the closest access point.

15. A computer program product comprising a computer-readable storage medium having program instructions embodied therewith, the program instructions executable by a processor to cause the processor to perform operations comprising:
   receiving, by a user device, a beacon frame from an access point of a wireless network;
   obtaining, by the user device from the beacon frame, direct link information for the wireless network, wherein the direct link information includes connection information for a guest network associated with the wireless network;
   receiving, by the user device from a user, a message intended for the device on the wireless network;
   connecting, by the user device, to a guest network; and
   transmitting, by the user device, the message to the device.

16. The computer program product of claim 15, wherein the user device is not connected to the wireless network when the user device receives the beacon frame.

17. The computer program product of claim 15, wherein the direct link information includes a guest service set identifier (SSID) for the guest network and a target link.

18. The computer program product of claim 17, wherein transmitting the message to the device includes transmitting a message to a location specified in the target link.

19. The computer program product of claim 15, wherein the direct link information is obtained from a vendor specific information field of the beacon frame.

20. The computer program product of claim 15, wherein the operations further comprise receiving, by the user device, a response to the message from the device while the user device is connected to the guest network.

* * * * *